(12) United States Patent
Tremblay

(10) Patent No.: US 6,202,522 B1
(45) Date of Patent: Mar. 20, 2001

(54) PORTABLE PIPE END PREPARATION MACHINE TOOL

(75) Inventor: Clement Tremblay, Citrus Heights, CA (US)

(73) Assignee: Tri Tool Inc., Rancho Cardova, CA (US)

(*) Notice: Subject to any disclaimer, the term of this patent is extended or adjusted under 35 U.S.C. 154(b) by 0 days.

(21) Appl. No.: 09/320,465

(22) Filed: May 27, 1999

(51) Int. Cl.$^7$ .................................................. B23B 5/16
(52) U.S. Cl. ................................ 82/113; 82/128; 82/130; 82/131
(58) Field of Search ........................... 82/113, 128, 130, 82/131, 141, 152, 153, 168; 407/113

(56) References Cited

U.S. PATENT DOCUMENTS

| | | | |
|---|---|---|---|
| 3,051,059 | * | 8/1962 | Davey ............................. 82/113 X |
| 3,421,196 | * | 1/1969 | Reich ................................. 407/113 |
| 3,813,747 | * | 6/1974 | Hertel ............................. 407/113 X |
| 3,982,451 | * | 9/1976 | Gilmore ............................... 82/113 |
| 4,437,366 | * | 3/1984 | Astle .................................. 82/113 |
| 5,531,550 | * | 7/1996 | Moruzzi ......................... 82/113 X |
| 5,810,522 | * | 9/1998 | Parker ............................ 82/113 X |
| 5,941,145 | * | 8/1999 | Marshall et al. .................... 82/113 |

* cited by examiner

Primary Examiner—Henry Tsai
(74) Attorney, Agent, or Firm—Bacon & Thomas, PLLC

(57) ABSTRACT

A portable machine tool for preparing pipe or other annular workpiece ends for welding includes a central mandrel shaft, a cutting head rotatably mounted on the mandrel shaft and a rotary drive connector on the cutting head arranged to concentrically fit within an annular drive head of a modular drive motor unit. The drive motor unit is restrained against torque reactive rotation by a torque reaction bar secured to the mandrel shaft so that relative rotation between the drive motor unit and the mandrel shaft is prevented. The tool is configured so that the annulus of the annular driving head of the drive motor unit can fit axially over the rearward portion of the tool for quick assembly and disassembly. The torque reaction bar is connected by a quick disconnect to the mandrel shaft to facilitate assembly and disassembly of the drive motor unit with a cutting head. A cutter element for use with the tool includes fastener openings symmetrically located so that the cutter can be located on a seat surface in four interchangeable orientations enabling interchangeable use of four cutting edges provided on the cutter.

38 Claims, 8 Drawing Sheets

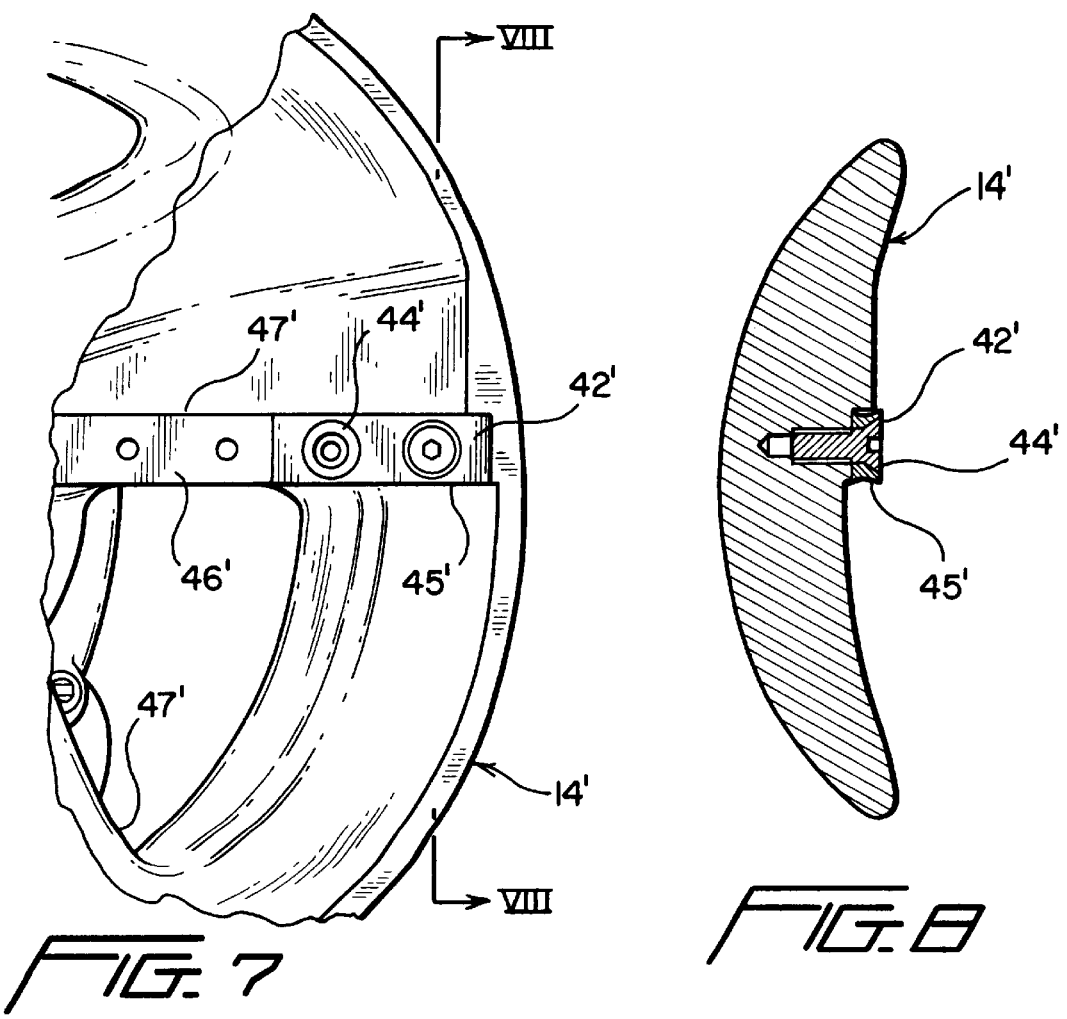
FIG. 7
FIG. 8
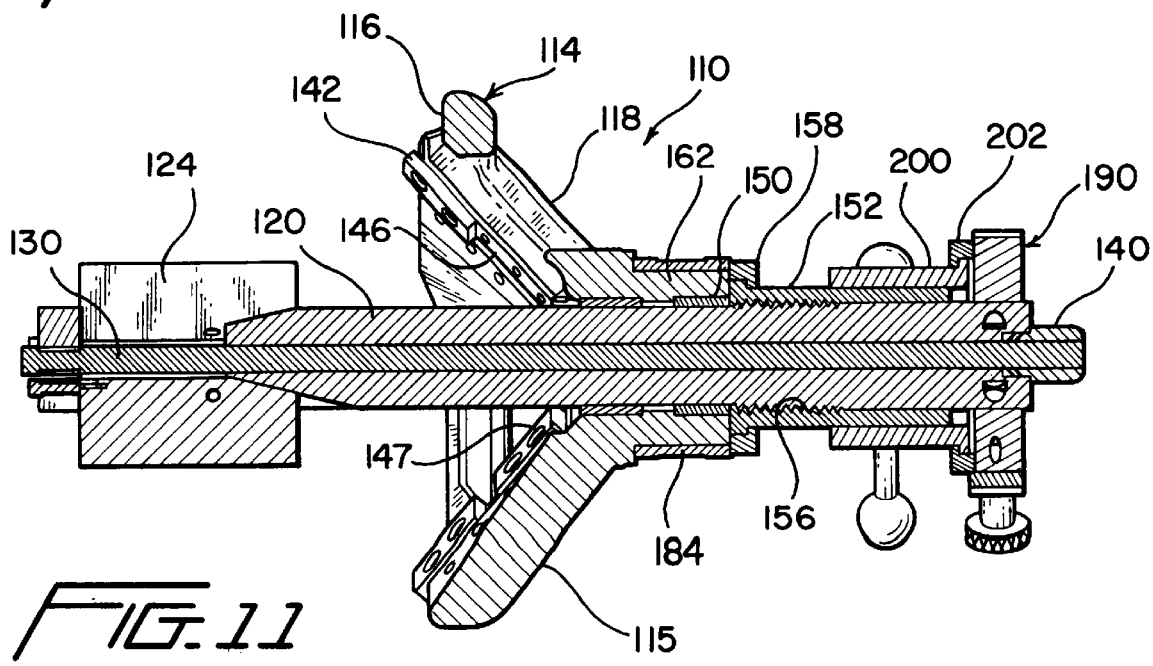
FIG. 11

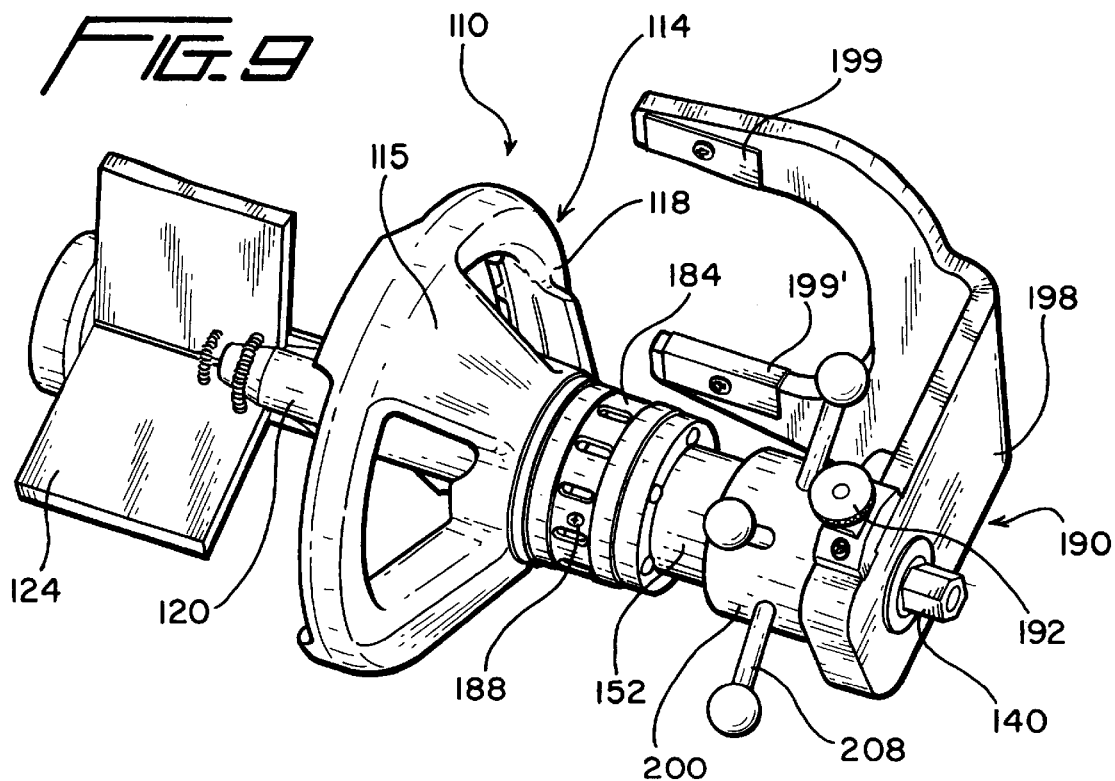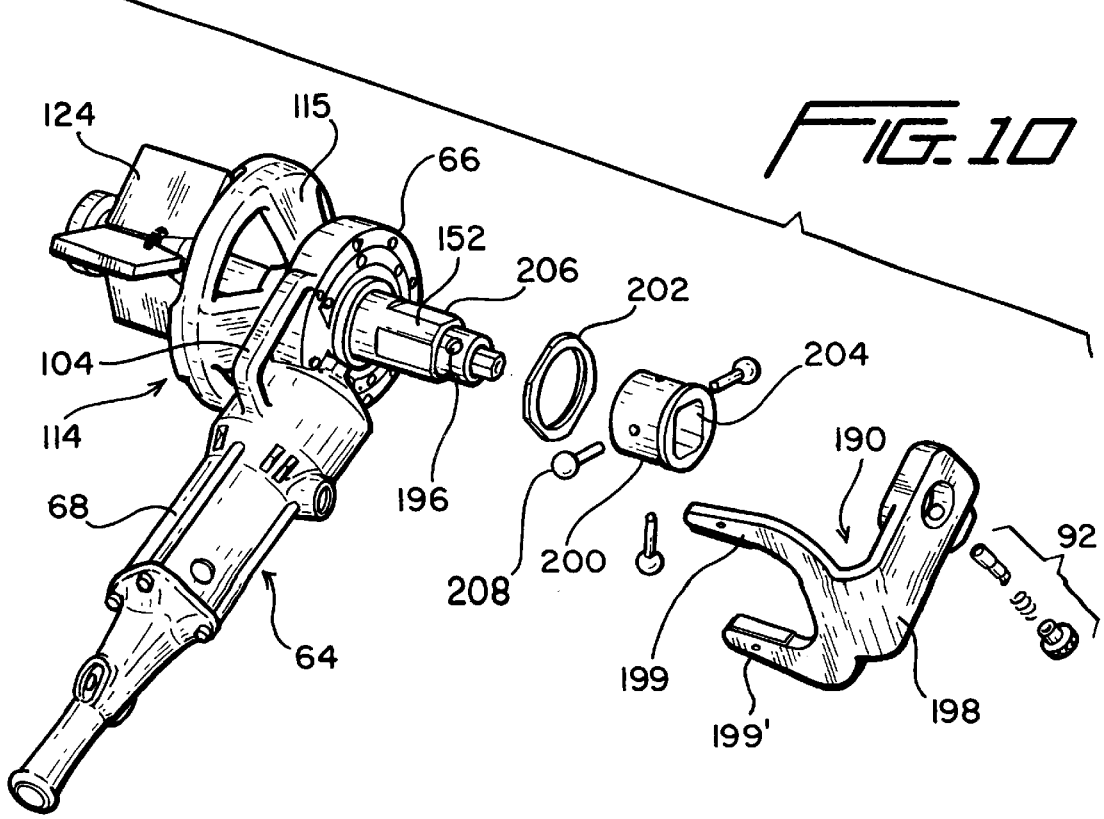

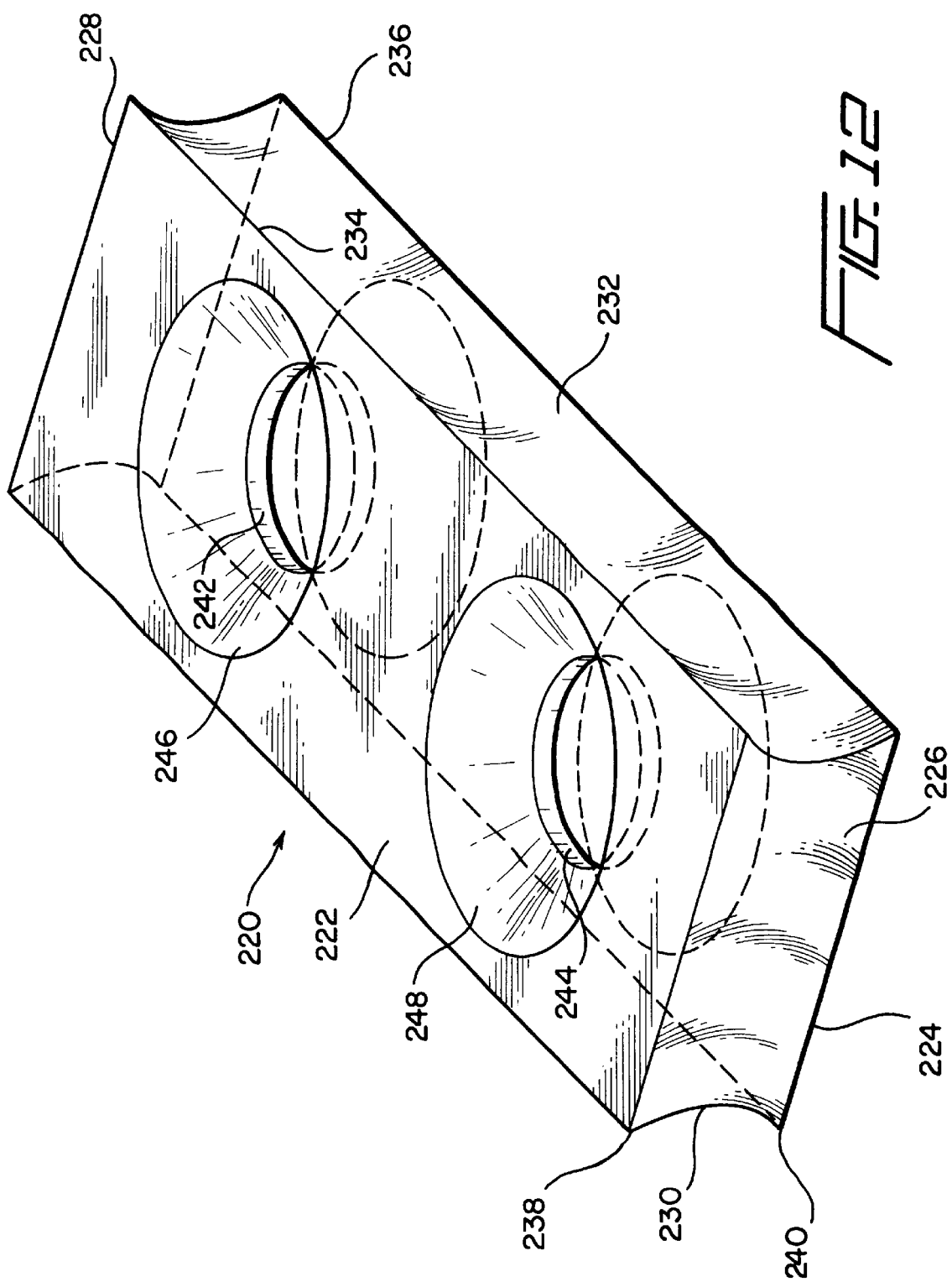

PORTABLE PIPE END PREPARATION MACHINE TOOL

FIELD OF THE INVENTION

This invention relates to a portable machine tool for preparing pipe workpiece ends for welding, in particular for beveling pipe ends.

BACKGROUND OF THE INVENTION

Portable machine tools for machining tubular workpieces such as pipes typically include a rotary cutting head on which there is mounted one or more cutter elements or bits that are advanced into engagement with the workpiece by advancing the cutting head along a central mandrel that supports the cutting head for rotation about and axial movement along the mandrel. The mandrel is secured to the workpiece by expandable or otherwise moveable workpiece engaging or locking elements that can be actuated by a tool operator to immobilize the tool relative to a tubular workpiece. Typically, in the case of pipe workpieces, the workpiece engaging elements are radially moveable blades or pins that frictionally engage the interior or exterior of a workpiece to lock the workpiece and tool together so that the cutting head can be precisely located relative to the end of the workpiece and manipulated to perform a machining operation, such as beveling or otherwise shaping the end of the workpiece in preparation for a subsequent welding procedure involving the workpiece.

In prior art devices of this kind, the drive motor is usually integrated with or connected to the tool such that the motor may drive the cutting head in rotation while the reaction torque between the cutting head and the motor is reacted back into the mandrel that is affixed to the workpiece. Various torque reacting schemes are described in the prior art to avoid reaction torque between a driving motor and a cutting head causing relative rotation between the motor (or the tool drive train) and the cutting head.

More recently, the use of single modular drive motor units, each including a driving head for engaging and driving various machine tools, including pipe end preparation tools, interchangeably with each other has become significant. In such arrangements, the driving head of the drive motor unit contains rotatable torque transmitting elements that are intended to engage rotary drive transmitting members on the various machine tools which enables the tools to be interchangeably used with a singular modular drive motor unit. This presents a problem, however, in reacting driving torque between a rotary cutting head of a portable machine tool driven by such a drive motor unit and the drive motor unit itself. Since the drive motor unit is a separate module that is quickly connectable and separable from the machine tool body, typical torque reacting schemes are not appropriate to restrain relative rotation between the drive motor unit and the mandrel shaft that is secured relative to the tubular workpiece.

The present invention is intended to solve this problem and to provide a portable machine tool for preparing pipe ends for welding that is compact, convenient to use, and can be utilized with a modular drive motor unit of the type described while restraining torque reaction movement of the drive motor unit relative to the mandrel shaft during operation of the tool.

BRIEF SUMMARY OF THE INVENTION

A portable machine tool for preparing pipe workpiece ends for welding in accordance with the invention includes a cutting head including one or more cutter element seat(s) on a forward side thereof and mounted on a mandrel shaft extending axially therethrough so that the cutting head can be both rotated about the mandrel shaft and moved axially along the mandrel shaft in a controlled manner. One or more cutter bit(s) is (are) provided on the cutter seat(s), each cutter preferably made in accordance with the cutter described herein.

Workpiece engaging elements are carried by the mandrel shaft for locking the mandrel shaft and cutting head relative to a pipe or tubular workpiece and a feed mechanism carried by the mandrel shaft cooperates with the shaft and the cutting head to advance and retract the cutting head in axially forward and rearward directions along the mandrel shaft when actuated. A rotary drive coupling carried by the cutting head is connectable with the drive head of a modular drive motor unit for transmitting driving torque between the driving head of the motor and the cutting head. In the preferred embodiment of the invention, the drive coupling is annular and the tool drive head also is annular. In use the tool drive head annulus fits over the drive coupling annular element.

In accordance with the invention, a torque reaction bar is secured to the mandrel shaft against relative rotation and includes a drive motor engaging member adapted to engage the drive motor to secure the drive motor against rotation relative to the mandrel shaft when the motor is connected to the drive coupling of the cutting head.

The feed mechanism is conveniently located for manipulation by the tool operator and may include an actuator element having handles for manipulation by the tool operator.

The torque reaction bar is quickly separable axially from the mandrel shaft by quick disconnect connectors to facilitate rapid assembly and disassembly of the drive motor unit from the cutting head. In the case of an annular drive head, the maximum diameter of the tool rearwardly of the drive coupling area engaged by the annular drive head of the drive motor unit does not exceed the inside diameter of the annular drive head so that the drive motor unit may be quickly assembled axially over the rearward side of the tool without interference when the torque reaction bar is removed from the mandrel shaft.

The forward side of the rotary cutting head is configured to provide one or more cutter bit or element seats radially extending along the forward face of the cutting head. The cutter bits may be located at various radial positions on the cutter seats to machine the end surfaces of various diameter pipes or tubular workpieces, and the seats may be inclined forwardly from the vertical to machine bevel surfaces on workpiece ends such as pipes and fittings.

Preferably, a cutter bit element used with the cutting head is configured so that it can be mounted at a single position on the cutter seat in any one of four orientations, each of which presents a sharpened cutting edge to the workpiece at the same cutting position during rotation of the cutting head. This is accomplished by forming the cutter so that it has four cutting edges symmetrically located with respect to fastener mounting apertures provided in the cutter. Thus, the cutter may be mounted on a respective seat by the fasteners in four different orientations, each of which presents a sharpened cutting edge at an identical position for performing a machining operation on a workpiece.

BRIEF DESCRIPTION OF THE DRAWINGS

FIG. 7 is a detailed view of a cutter bit element installed on a cutter seating area on the cutting head of the tool shown in FIG. 1;

FIG. 8 is a section view taken along line VIII—VIII of FIG. 7;

FIG. 9 is an upper perspective view of an alternate embodiment of the tool shown in FIG. 1;

FIG. 10 is a partial exploded view of the tool shown in FIG. 9;

FIG. 11 is a longitudinal section view of the tool shown in FIG. 9; and

FIG. 12 is a perspective view of a cutter element usable with the tools shown in the above views.

DETAILED DESCRIPTION OF PREFERRED EMBODIMENTS OF THE INVENTION

Figure 1:
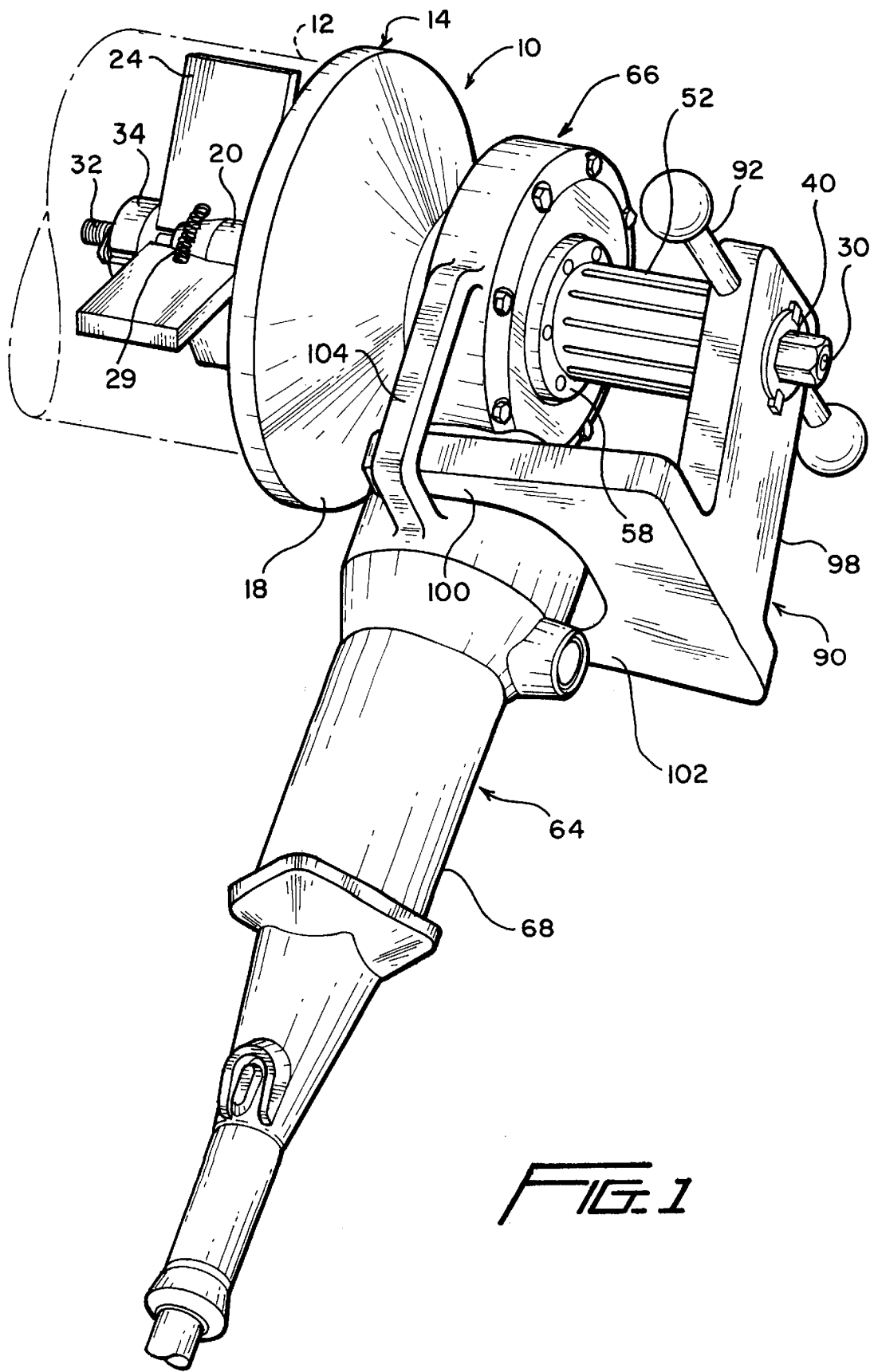
FIG. 1 is an upper perspective view of a portable machine tool for preparation of tubular or annular workpieces for welding using a modular drive motor unit and a torque reaction bar for preventing relative rotation between the drive motor unit and a central mandrel extending longitudinally within the tool in accordance with one preferred embodiment of the invention.
Figure 2:
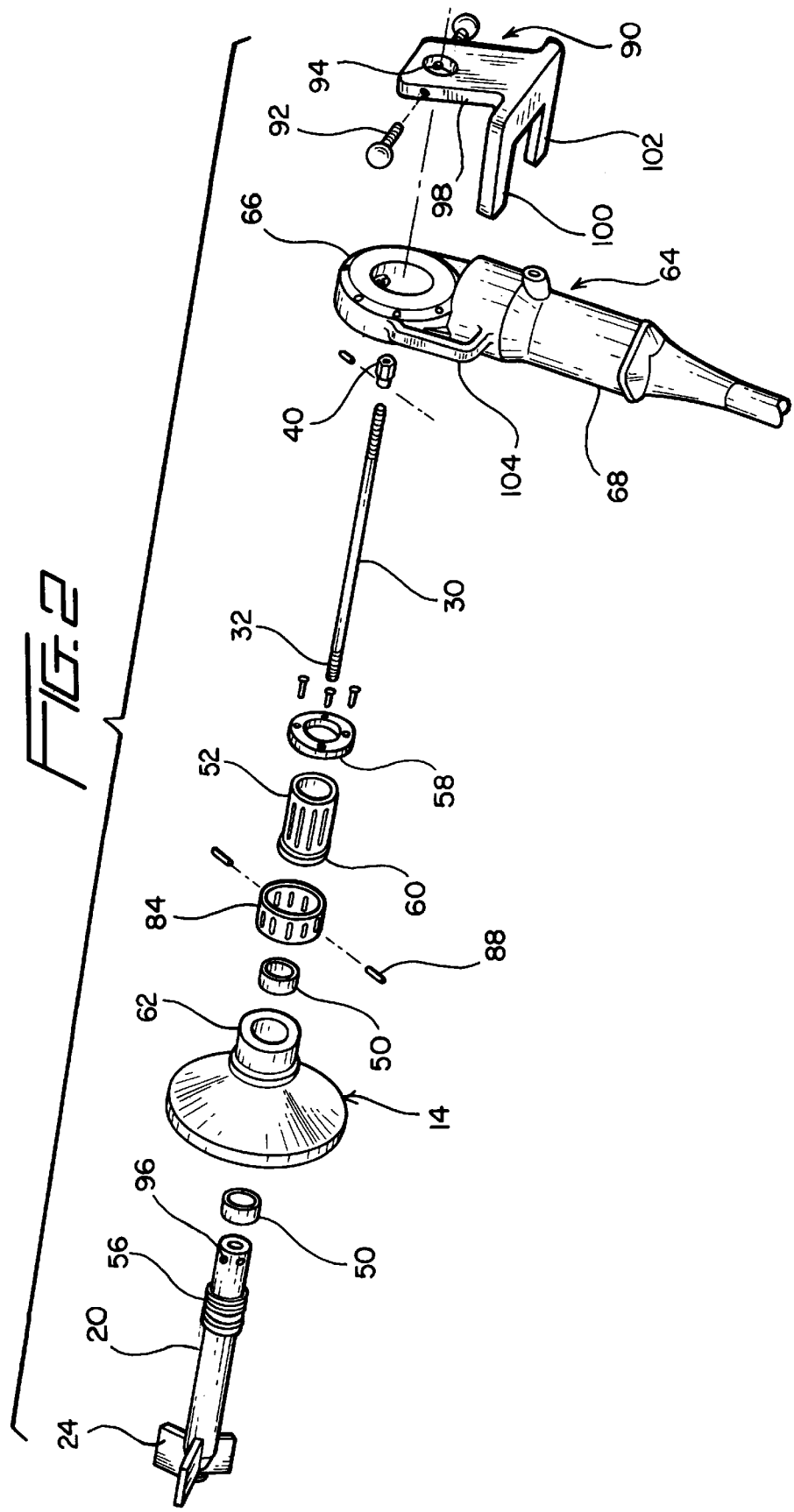
FIG. 2 is an exploded isometric view of the tool shown in FIG. 1.
Figure 3:
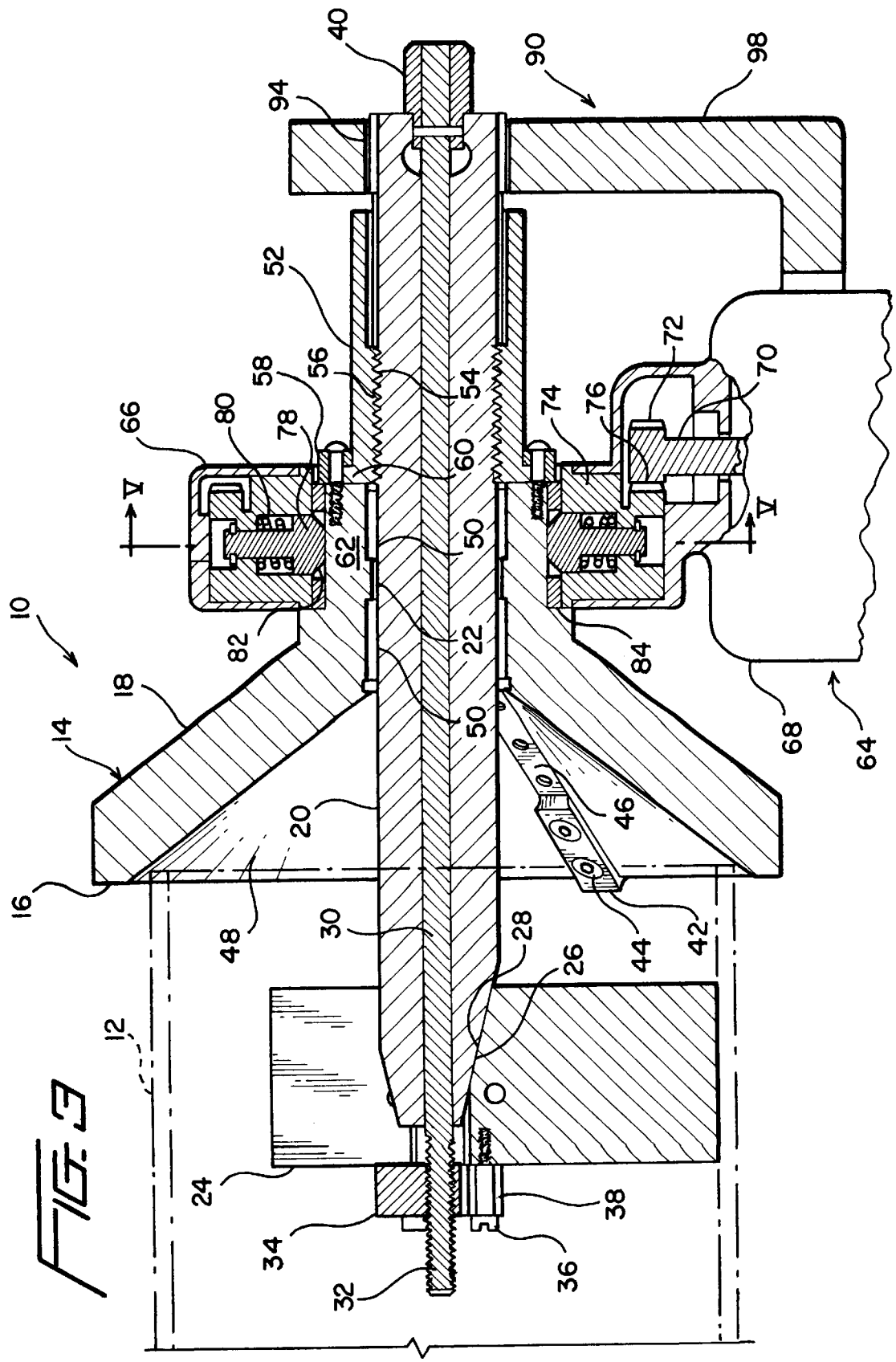
FIG. 3 is a longitudinal partial section view of the tool shown in FIG. 1.
Figure 4:
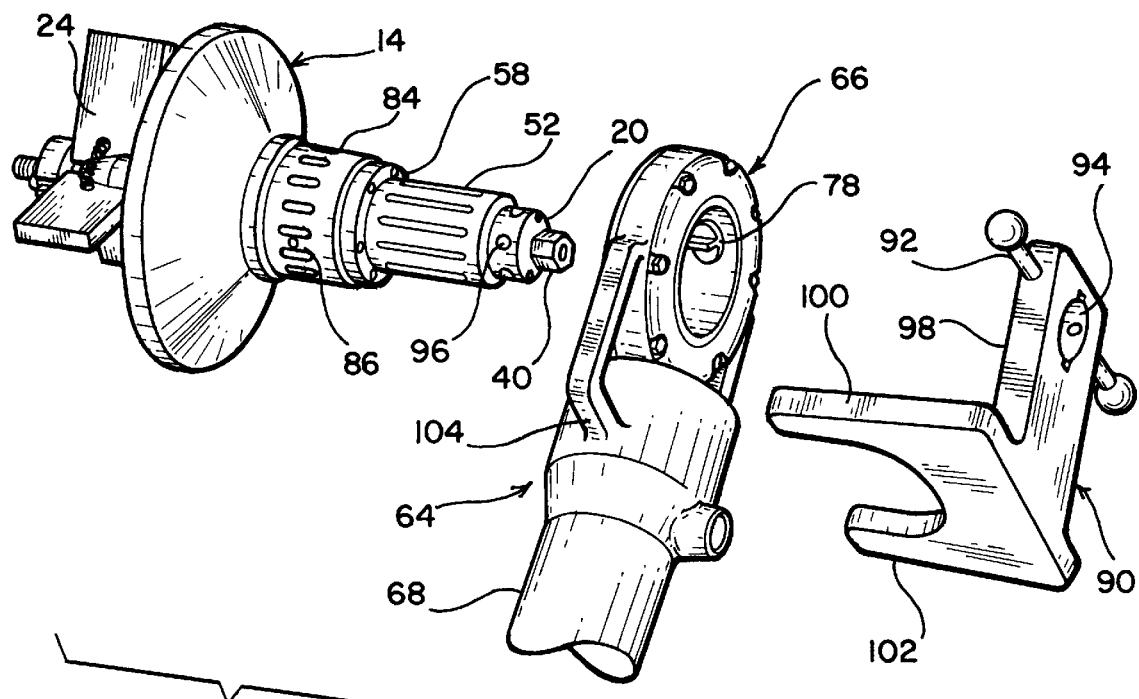
FIG. 4 is a partially exploded isometric view of the tool shown in FIG. 1 illustrating the relationship between the drive motor unit, the torque reaction bar and the main tool body.
Figure 5:
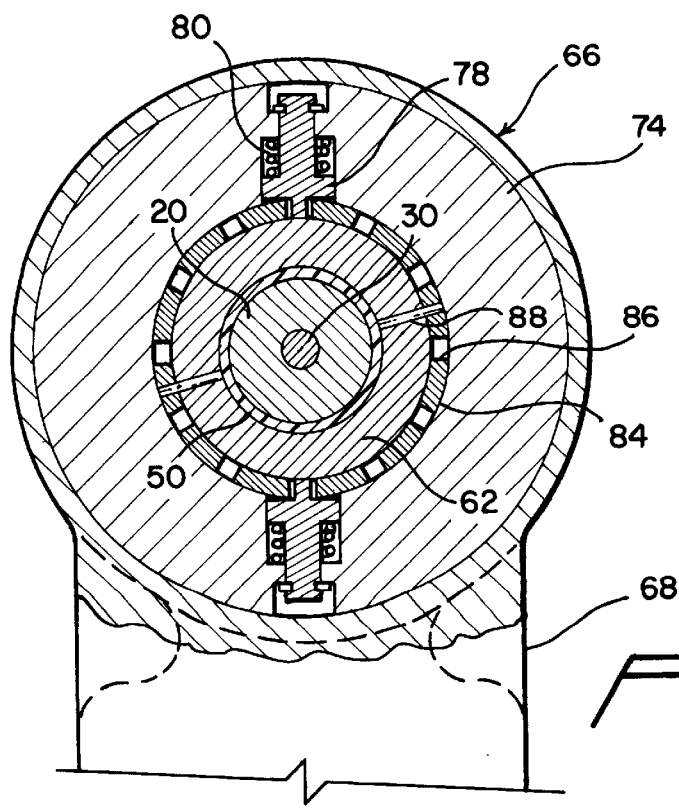
FIG. 5 is a vertical section view taken along line V—V in FIG. 3.

With reference to FIGS. 1, 2 and 3, a portable machine tool 10 especially adapted for preparation of the ends of tubular workpieces such as pipes, tubular conduits or fittings 12 includes a rotary cutting head 14 having a forward side 16 and a rearward side 18. The forward side 16 faces towards a workpiece 12 to be machined by the tool 10 and the rearward side 18 faces in the opposite direction.

A central mandrel shaft 20 extends through a bore 22 located centrally and axially in cutting head 14, the mandrel shaft extending forwardly beyond the forward side 16 of the cutting head 14 and rearwardly beyond the rearward side 18 of the cutting head.

Workpiece securing elements 24 are located towards the forward end of the mandrel shaft 22 and are arranged to engage, in accordance with the illustrated embodiment, the interior surface of an annular workpiece 12 such as a pipe, fitting and the like, when actuated in a manner to be described below. When the workpiece securing elements 24 are fully engaged within a workpiece 12, it will be apparent that mandrel shaft 20 along with cutting head 14 will be rigidly secured against relative rotational and axial movement with respect to the workpiece 12, and the mandrel shaft 20 will be substantially centered in the workpiece.

The forward end of mandrel shaft 20 includes a plurality of circumferentially spaced tapered ramp surfaces 26 that are milled, slotted or otherwise formed on the mandrel shaft 20. The workpiece securing elements 24 each include a tapered ramp surface 28 that fits in contiguous relationship with a ramp surface 26 on the mandrel shaft 20 when the workpiece securing elements 24 are assembled to the forward end of the mandrel shaft. One or more spring or other resilient elements 29 retain the workpiece securing elements 24 on the mandrel shaft 20 so that the ramp surfaces 26,28 are engaged with and slidable relative to each other in a longitudinal direction along the mandrel shaft 20. Movement of the workpiece securing elements 24 longitudinally towards the right in FIG. 3 for example causes the securing elements 24 to expand radially outwardly into engagement with the inner circumference of workpiece 12 to thereby lock the mandrel shaft 20 coaxially within the workpiece 12 in rigid relationship so that relative rotational and axial movements are constrained.

An actuating rod 30 includes a threaded distal end 32 on which is threaded a drive head 34 that is secured to each of the workpiece securing elements 24 by an appropriate fastener such as fasteners 36 extending through slots 38 extending radially in driving head 34.

Actuating rod 30 extends completely through the mandrel shaft 20 to its rearward or proximal end and includes an appropriate actuating element 40 connected to the end of rod 30 for enabling a tool or other appropriate device, including a hand crank, if desired, to be applied to the actuating rod 30 to effect its rotation in opposite directions. Rotation of the actuating rod 30 causes the driving head 34 to selectively advance the workpiece securing elements 24 longitudinally along the mandrel shaft 20 to cause their expansion outwardly as they cooperate with ramp surfaces 28 to thereby lock the mandrel shaft 20 relative to workpiece 12 or, alternatively, upon reverse rotation of the rod 30, to release the workpiece securing elements 24 from engagement with the workpiece 12 by causing their retraction movement longitudinally along the mandrel shaft 20 in a forward direction. A cam actuator mechanism (not shown) or other actuation device could be used to operate rod 30, if desired.

The forward side of cutting head 14, in accordance with the preferred embodiment of this invention, includes at least one cutter element or bit 42 secured by threaded fasteners 44 to a cutter element seat 46 that extends radially and forwardly relative to the longitudinal center or axis of cutting head 14. The forward inclination of the cutting seats 46 in accordance with this embodiment of the invention will produce a bevel on the end of workpiece 12 during operation of the machine tool 10 in a manner to be described below.

While the forward side 16 of the cutting head 14 is illustrated as having a continuous conical surface 48 on which a cutter element seat 46 is machined, it will be understood that a plurality of cutter element seats 46 may be located along surface 48 or spoke-like elements constituting the cutting head 14. An example of the latter embodiment will be described below in connection with the views shown in FIGS. 9–11.

It is to be understood that the cutting head 14 may be configured differently so that each cutter element seat 46 extends radially relative to the longitudinal center line of cutting head 14 and that the selection of the configuration of the forward side of cutting head 14 will depend upon the specific machining operation to be performed on the end area of an annular workpiece. In the following description, it will be assumed that the cutting head 14 is configured as a pipe beveling tool in accordance with the illustrated views of the preferred embodiments of the invention.

The cutting head 14 is mounted for relative rotation about mandrel shaft 20 by bearings 50 which also permit longitudinal sliding movement of the cutting head 14 relative to the mandrel shaft 20.

Axial motion of cutting head 14 relative to mandrel shaft 20 is controlled by a feed mechanism including an annular rotary feed actuator 52 having internal threads 54 that are threaded onto external threads 56 that are provided on a portion of mandrel shaft 20 as illustrated. The feed actuator 52 is secured to the rearward side 18 of cutting head 14 by a connecting ring 58 that engages a flange 60 of feed actuator 52 to thereby secure feed actuator 52 against relative axial movement relative to cutting head 14 while yet permitting relative rotation between the feed actuator 52 and the cutting head 14.

It will be apparent that upon rotation of the feed actuator 52 relative to the mandrel shaft 20, the feed actuator 52 will be advanced by the threaded connection along the mandrel shaft 20 and will carry with it the cutting head 14 so that, as illustrated in FIG. 3, cutter element 42 may be advanced (or retracted) relative to the end of workpiece 12.

The rearward side of cutting head 14 includes an axially projecting hub 62 having a diameter less than the main body of the cutting head 14 and which is arranged to receive input drive torque from a modular drive motor unit 64 that includes an annular driving head 66 that is intended to be received concentrically over the hub 62 to provide rotary input motion to cutting head 14.

The modular drive motor unit 64 includes a motor housing 68 that contains a motor (not shown) that may be energized by electrical, fluid, pneumatic or other available energy. As illustrated in FIG. 3, the motor is connected to an output drive shaft 70 that terminates at pinion gear 72. Ring gear 74 is meshed with pinion gear 72 at gear teeth 76 whereby rotation of the motor output shaft 70 causes rotation of pinion gear 72 and rotation of ring gear 74 that will be concentrically located around a rotary drive coupling on hub 62, to be described below.

Ring gear 74 carries one or more multiple spring-biased radially extending drive pawls 78 that are normally biased radially inwardly towards the center of the drive head 66 but which may be displaced radially outwardly against the bias of spring elements 80 to enable quick engagement of the drive head 66 with a tool element to be driven in rotation by the motor unit 64. As shown in FIG. 3, the drive pawls 78 have tapered longitudinal end surfaces 82 to facilitate an interlocking snap-fit action between the drive pin 78 and a driven tool member with which the drive head 66 cooperates. The drive motor unit 64 including the details of the drive head 66 are conventional and do not constitute per se a part of the present invention. Rather, the present invention is intended to cooperate with a conventional modular drive motor unit 64 having an annular cutting head 66 of the type shown and described.

To enable cooperation between the drive head 66, the drive pawls 78 and the cutting head 14, a rotary annular drive coupling element 84 having longitudinal grooves or slotted apertures 86 extending radially therein is concentrically mounted in close fitting relationship on hub 62 of cutting wheel 14. In accordance with the preferred embodiment of the invention, the rotary drive coupling member 84 is freely relatively rotatable about hub 62, but is normally coupled to the hub 62 by the shear pins 88 that are configured and dimensioned to limit maximum drive torque that may be transmitted through the drive coupling 84 to the hub 62 of cutting head 14, in accordance with known principles. Specifically, excess torque will shear the pins and permit the annular drive coupling element 84 to rotate freely about hub 62. It will be apparent that the drive coupling member 84 may be coupled to the hub 62 in any appropriate manner known to those skilled in the art, including splines, fasteners, and other mechanical interlocking devices suitable for the intended purpose.

In operation, actuation of the drive motor unit 64 to cause rotation of ring gear 74 in the manner previously described will cause input rotary motion to be applied to the rotary drive coupling 84 through the drive pawls 78 after drive head 66 has been located concentrically over annular drive coupling 84 by axially sliding same over the rearward end of the mandrel shaft 20. The tapered surfaces 82 on the drive pawls 78 will facilitate obtaining a snap connection between the drive pawls 78 and respective grooves 86 in drive coupling 84. Once the pawls 78 are secured in respective grooves 86, rotation of the ring gear 74 will be transmitted to the cutting head 14 via the shear pins 88. However, if the drive motor unit 64 is not constrained against rotational movement about the axis of mandrel shaft 20, during a machine cutting operation when the cutter elements 42 are being driven in cutting relationship with the end of a tubular workpiece 12, reaction torque between the cutting head 14 and the drive motor unit 64 could result in dangerous and undesired rotation of the drive motor housing 68 around the mandrel shaft 20 as the motor within the drive unit 64 attempts to rotate the ring gear 74 against the resistance of the cutting head 14, despite attempts by a tool operator to restrain movement of the motor unit. It is important in accordance with the present invention that an appropriate device positively restrain rotary movement of the drive motor unit 64 relative to the mandrel shaft 20.

This objective is achieved in accordance with the present invention by providing a drive torque reaction bar 90 that is removably coupled to the mandrel shaft 20 by quick disconnect connectors 92. The drive torque reaction bar 90 includes a bore 94 that is fitted over the proximal or rear end of mandrel shaft 20 and is retained at such position by the connectors 92 that are constituted of spring biased pins that are normally urged radially inwardly but which may be manipulated to a radially outer position whereat the pins clear the mandrel shaft 20. In their radially inner position, the connectors 92 cooperate with apertures 96 in mandrel shaft 20 to lock the torque reaction bar 90 against rotary and axial displacement relative to the mandrel shaft 20. While quick disconnect connectors 92 have been illustrated in accordance with the preferred embodiment, it is to be understood that any suitable fastener arrangement can be utilized that is known to those skilled to permit the reaction bar 90 to be axially assembled to the proximal end of mandrel shaft 20 in a removable manner while preventing relative rotary and axial displacement of the reaction bar 90 when it is fully assembled and secured to the mandrel shaft 20.

The connecting arrangement between the mandrel shaft 20 and the reaction bar 90 permits the reaction bar 90 to be quickly installed over the mandrel shaft 20 after the cutting head 66 of the drive motor unit 64 has been assembled over the drive coupling 84 when the tool is set up to perform a machining operation on a workpiece. This assembly of the drive motor unit 64 is facilitated by the ability to quickly and conveniently remove the drive torque reaction bar 90 from the mandrel shaft 20 so that the annular drive head 66 of drive motor unit 64 may be advanced over the rearward end of mandrel 20, over feed actuator 52 and over the drive coupling 84. Upon installation of the torque reaction bar 90, the tool and motor are ready for service. The inner diameter of the annulus of drive head 66 of motor unit 64 has a known size and all elements of the tool 10 constructed in accordance with the invention located rearwardly of the drive coupling 84 except the torque reaction bar are sized so as to have a radial dimension that permits the annulus of the drive head to axially fit thereover.

The drive torque reaction bar 90 includes a first radially extending leg 98 and a pair of axially extending legs 100,102 that extend longitudinally generally parallel to the mandrel shaft 20 along a direction extending towards cutting head 14. The three legs 98, 100, 102 are rigidly connected together to form a structural unit, although it will be understood that the connection between the longitudinal legs 100,102 and the radial leg 98 may be formed in any appropriate manner that will function in the same or equivalent manner as the illustrated embodiment of the drive torque reaction bar 90. Also, under some circumstances a single longitudinally extending leg 100 or 102 will be sufficient and appropriate to effect the desired torque restraint against drive motor unit 64. The legs 100 and 102, in the preferred embodiment, lie in a common transverse plane extending parallel to a transverse plane including the mandrel shaft. However, the one of the legs 100, 102 could be divided from the other leg, with both legs carried by first leg 98. Also, it should be understood that the axial orientation of legs 100, 102 may be selected to cooperate with any specific drive motor unit and could assume any shape or configuration to achieve this objective.

Figure 6:
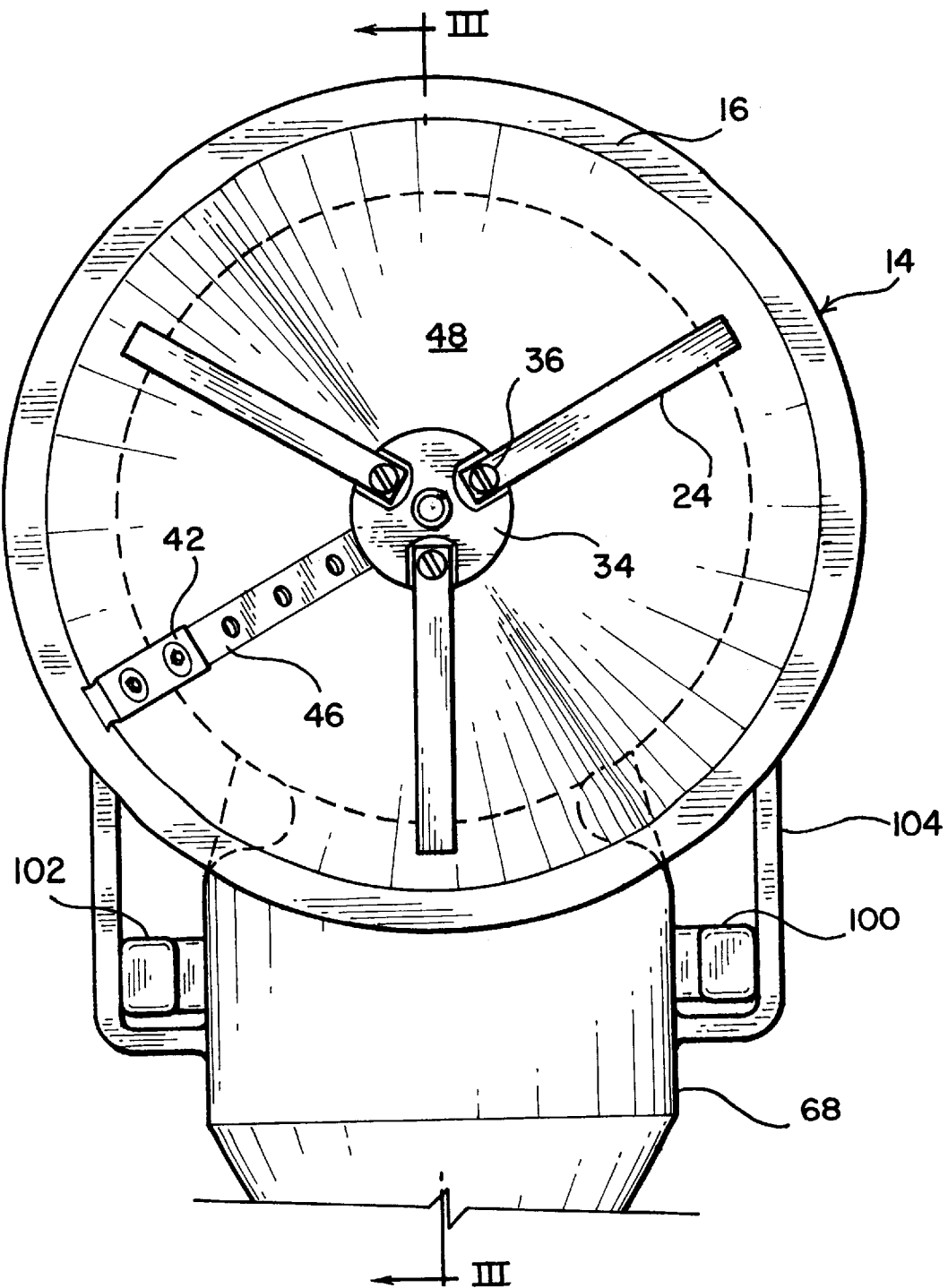
FIG. 6 is a left end view of the tool shown in FIG. 1.

The housing 68 of drive motor unit 64 includes manipulating handles or projections 104 on opposite sides of the housing and intermediate the housing and the drive head 66. This provides a convenient area between the handles 104 and the housing 68 in which longitudinally extending legs 100,102 of torque reaction bar 90 may extend. The spacing between the longitudinally extending legs 100,102 is selected so as to overlie the adjacent housing 68 of drive motor unit 64 as shown, for example, in FIGS. 1 and 6.

When tool cam is fully assembled with the drive head 66 of drive motor unit 64 concentrically located over the hub 62 and drive coupling 84, torque reaction bar 90 will be secured to the mandrel shaft 20 against relative axial and rotary displacement with longitudinal legs 100,102 closely overlying the housing 68 of drive motor unit 64. As thus assembled, it will be apparent that relative rotation between the drive motor unit 64 and the mandrel shaft 20 is positively prevented by the torque reaction bar 90 that effectively locks the motor housing 68 against relative rotation with respect to the mandrel shaft 20. While a single longitudinal leg 100 could be effective to achieve this objective with some drive motor units, the use of dual legs is preferred because of the added torque reaction capability of this configuration, particularly in opposite rotary directions.

When cutting head 14 is formed with radially and forwardly extending spoke portions instead of a solid conical surface as illustrated in FIG. 1, cutter seat surfaces 46' shown in FIGS. 7 and 8 may extend along the forward side of a respective spoke 47' extending between the central area of the cutting head 14 and a radially outer peripheral area thereof. Cutter elements 42' are secured to the seats 46' by countersunk headed threaded fasteners 44' and the material of the cutting head 14' is shaped so that the leading cutting edge 45' of cutter element 42' is fully exposed and clear of cutting head structure as shown in FIG. 8.

An alternate embodiment of the invention is presented in FIGS. 9, 10 and 11, wherein the machine tool 110 embodying the invention includes a cutting head 114 configured to perform a beveling maching operation on an annular pipe or fitting workpiece, the cutting head including a forward side 116 and a rearward side 118.

The cutting head 114 is rotatably mounted on mandrel shaft 120 and axially slidable thereon by means of bearings 150 between an axially extending bore in the cutting head 114 and the periphery of mandrel shaft 120.

The cutting tool 110 includes workpiece engaging elements 124 that correspond to the workpiece engaging elements 24 of the embodiment of the invention illustrated in FIG. 1. Actuation of the workpiece engaging elements 124 is carried out in the same manner as describe previously in connection with the embodiment of the invention illustrated in FIG. 1, namely, an actuating rod 130 extends longitudinally through the mandrel shaft 120 and actuates movement of the workpiece engaging elements 124 upon rotation or other manipulation of the rod 130 via rod actuator 140.

The cutting head 114 comprises radially and generally forwardly inclined spoke elements 115 having cutter element seats 146 provided on the forward sides thereof, said cutter elements seats including threaded apertures 147 that are used to receive threaded fasteners for securing cutter elements 142 against the seats 146 at various radial positions.

The cutting head 114 includes a hub portion 162 on its rearward side and a feed actuator 152 is internally threaded and coupled to external threads 156 provided on mandrel shaft 120 as illustrated in FIG. 11.

Feed actuator member 152 is connected to the hub 162 of cutting head 114 by a ring element 158 that permits relative rotation between the feed actuator 152 and the hub 162, while preventing relative axial displacement between these members.

An annular rotary drive coupling 184 is coupled to the hub 162 by an appropriate drive connection such as a shear pin 188 (see FIG. 9).

In accordance with this embodiment, the feed actuator member 152 is manipulated through a rotary annular actuator element 200 that is rotatably connected to torque reaction bar 190 by a flange connector 202 secured by fasteners to the forward side of torque reaction bar 190. The actuator 200 is assembled in telescopic relationship over (or within) feed actuator member 152 and includes in this embodiment a squared inner bore 204 that cooperates with machined flats 206 on the outer surface of feed actuator member 152. Of course, any driving connection between actuator 200 and feed actuator member 152 known to those skilled in the art can be used, but the telescopic connection has advantages of compactness, reliability and convenience.

Accordingly, as shown in FIG. 10, the actuator 200 can be axially slid over the feed actuator member 152 in telescopic relationship so that rotation of the actuator 200 will cause rotation of the feed actuator member 152. Disassembly of the torque reaction bar 190 from mandrel shaft 120 in an axial rearward direction will result in the actuator 200 being separated from the feed actuator member 152 along with the torque reaction bar 190.

This arrangement permits placement of manipulating handles 208 on the actuator 200 to facilitate manipulation of the feed actuator member 152 by a tool operator.

The torque reaction bar 190 in this embodiment is essentially configured in the same manner as the torque reaction bar 90 described previously in connection with the embodiment of the invention shown in FIG. 1. Specifically, the reaction bar 190 includes a first radially extending leg 198 and preferably a pair of longitudinally extending legs 199, 199' rigidly connected to the first leg 198.

The torque reaction bar 190 is secured to the mandrel shaft 120 by a quick disconnect coupling or fastener 192 that is comprised of a spring biased pin that may be inserted into one of several circumferentially spaced radial apertures 196 in the adjacent rearward end area of mandrel shaft 120.

Drive motor unit 64 is manipulated so that the annular cutting head 66 is placed axially over the mandrel shaft 120 so that it is connected coaxially with drive coupling 184. The torque reaction bar 190 is then assembled over the mandrel shaft 120 with the actuator 200 telescopically overlying feed actuator member 152 with the flats 206 thereon engaged within the bore 204 of the actuator 200. When so assembled, the longitudinally extending second and third legs 199,199' of torque reaction bar 190 extend up to and overlie the housing 68 of drive motor unit 64 adjacent the handle members 104. In this manner, relative rotation between the drive motor unit 64 and the mandrel shaft 120 is prevented.

A cutter element 220 suitable for use with the cutting heads described above is illustrated in FIG. 12, wherein cutter element 220 comprises a generally rectangular hardened tool steel body having opposed parallel top and bottom sides 222,224, opposed parallel end sides 226,228 spanning the top and bottom sides, and opposed lateral sides 230,232 that are shaped so they are symmetrically inwardly concave to leave four sharpened cutting edges 234,236,238,240 at the intersection of the lateral sides 230,232 with the top and bottom sides 222,224. The contour of the concave sides 232 and the cutting edges 234,236,238,240 may be selected in accordance with known principles of tool cutter bit design.

The cutter body 220 includes transversely extending apertures 242,244 that intersect the top and bottom sides 222,224 along countersunk surfaces 246,248. The apertures 242,244 are positioned symmetrically relative to the ends and sides of the cutter 220 so that the cutter may be installed at a single position on a cutter seat in any of four orientations to thereby present any one of the four cutting edges 234, 236,238,240 to a workpiece at an identical cutting position when driven in rotation by a cutting head on which the cutter is mounted. Accordingly, a single cutter 220 is configured to have four cutting edges that can be selectively utilized interchangeably when the cutter is mounted on a cutter seat of a rotatable cutting head.

While countersunk surfaces 246,248 are used in accordance with the preferred embodiment of the invention, it will be understood counterbore or other centering surfaces may be utilized at the intersection of the bores 242,248 with the top and bottom surfaces 222,224. It is only essential that the location of the apertures 242,244 be entirely symmetrical with respect to the end sides 226,228 as well as the opposed lateral sides 230,232 so that the position of a respective cutting edge 234,236,238,240 will always be consistent with respect to a cutter seat surface against which the cutter is secured by appropriate fasteners extending through apertures 242,244.

While specific embodiments of the invention have been described above in conjunction with the appended drawings, it is to be understood that structural variations are possible without departing from the spirit and scope of the invention which is defined in the claims below.

I claim:

1. A portable machine tool for preparing annular workpiece ends for welding, comprising:
    a rotary cutting head having axially forward and rearward sides, and including at least one cutter seat on the forward side thereof;
    a mandrel shaft extending axially through the cutting head; said cutting head supported on the mandrel shaft for relative rotation on and axial movement along the mandrel shaft;
    workpiece engaging elements movably carried by the mandrel shaft located towards the cutting head forward side and configured to be moveable relative to and to engage a workpiece located forwardly of and adjacent the cutting head;
    said workpiece engaging elements adapted to secure a workpiece located forwardly of and adjacent the cutting head and said mandrel shaft against relative rotation and axial motion when engaged with such workpiece;
    a feed mechanism carried by the mandrel shaft on the rearward side of the cutting head and cooperating with the mandrel shaft and cutting head to advance and retract the cutting head in axially forward and rearward directions along the mandrel shaft when actuated;
    a rotary drive coupling carried by the cutting head on its rearward side, said drive coupling drivingly connected to the cutting head and connectable in driving relationship with a rotary drive motor unit locatable rearwardly of the cutting head; and
    a torque reaction bar secured to the mandrel shaft rearwardly of the cutting head, the reaction bar non-rotatably secured to the mandrel shaft and including a drive motor unit engaging member adapted to engage a rotary drive motor unit locatable rearwardly of the cutting head and connectable to the rotary drive coupling and to secure such drive motor unit against rotation relative to the mandrel shaft when such motor is connected to the drive coupling.

2. The portable machine tool as claimed in claim 1, wherein the torque reaction bar includes a first leg element extending generally transversely of the mandrel shaft and at least one second leg element carried by the first leg element and extending generally adjacent the mandrel shaft at a location transversely spaced from the mandrel shaft and towards the cutting head.

3. A portable machine tool as claimed in claim 2, wherein the torque reaction bar includes a third leg element carried by the first leg element and extending generally adjacent the second leg element in a direction towards the cutting head.

4. A portable machine tool as claimed in claim 3, wherein the second and third leg elements lie in a common plane extending parallel with a transverse plane including the mandrel shaft and spaced laterally from the mandrel shaft.

5. A portable machine tool as claimed in claim 1 or 2, wherein the torque reaction bar is removably secured to the mandrel shaft.

6. A portable machine tool as claimed in claim 1 or 2, wherein the torque reaction bar is adjustably mounted on the mandrel shaft so that it can be non-rotatably coupled to the mandrel shaft at various circumferential positions on the mandrel shaft.

7. A portable machine tool as claimed in claim 1, wherein the torque reaction bar is removably secured to the mandrel shaft, and is adjustably mounted on the mandrel shaft by a connector so that it can be non-rotatably coupled to the mandrel shaft at various circumferential positions on the mandrel shaft.

8. A portable machine tool as claimed in claim 7, wherein the connector is a quick disconnect connector.

9. A portable machine tool as claimed in claim 1, wherein the feed mechanism is located between the cutting head and the torque reaction bar.

10. A portable machine tool as claimed in claim 1, wherein the feed mechanism comprises an internally threaded annular member concentrically mounted on the mandrel shaft; said mandrel shaft includes external threads coupled to internal threads of said annular member; and said annular member is arranged to be manually manipulable and rotatable by a hand of a tool operator during operation of the cutting tool to thereby move said cutting head axially along said mandrel shaft.

11. A portable machine tool as claimed in claim 10, wherein the feed mechanism annular member is connected by a rotary coupling located on the rearward side of the cutting head, said rotary coupling arranged so as to enable relative rotation between the cutting head and the feed mechanism while connecting the cutting head and feed mechanism together for simultaneous axial movement along the mandrel shaft.

12. A portable machine tool as claimed in claim 1, wherein said rotary drive coupling is drivingly connected to said cutting head by a torque limiting device that prevents driving torque exceeding a given threshold from being applied to the cutting head by the rotary drive coupling.

13. A portable machine tool as claimed in claim 12, wherein said torque limiting device comprises at least one shear pin extending between the rotary drive coupling and the cutting head.

14. A portable machine tool as claimed in claim 1, including an actuating rod for actuating said workpiece engaging elements, said actuating rod extending concentrically within the mandrel shaft and drivingly coupled to said workpiece engaging elements so that movement of the rod causes radial movement of the workpiece engaging elements; and a rod actuating device connected to the rod and associated with the mandrel shaft to cause, when moved, movement of the actuating rod to effect movement of the workpiece engaging elements.

15. A portable machine tool as claimed in claim 1, wherein said at least one cutter seat is inclined forwardly relative to the mandrel shaft.

16. A portable machine tool as claimed in claim 1, wherein the forward side of the cutting head includes multiple cutter seats that are inclined forwardly relative to the mandrel shaft, each seat including a plurality of threaded apertures spaced along each seat for receiving cutter securing threaded fasteners at various radial locations along each seat.

17. A portable machine tool as claimed in claim 1, wherein said feed mechanism comprises an internally threaded annular member concentrically mounted on the mandrel shaft; said mandrel shaft includes external threads coupled to internal threads at said annular member; and a feed mechanism actuator carried by the drive torque reaction bar and connected in rotary driving relationship with the annular member, said feed mechanism actuator including a handle element for facilitating rotary manipulation of the drive member by a tool operator.

18. A portable machine tool as claimed in claim 17, wherein said drive torque reaction bar is connected to the mandrel shaft by an axially separable connection and said feed mechanism actuator is connected to the annular member by a telescoping sliding connection arranged to enable axial sliding separation of the feed mechanism actuator from the annular member.

19. A portable machine tool for preparing pipe workpiece ends for welding comprising:

a cutting head having axially forward and rearward sides, and including at least one cutter seat on the forward side thereof;

a mandrel shaft extending axially through the cutting head; said cutting head supported on the mandrel shaft for relative rotation on and axial movement along the mandrel shaft;

workpiece engaging elements movably carried by the mandrel shaft located towards the cutting head forward side and configured to be moveable relative to and to engage a workpiece located forwardly of and adjacent the cutting head;

said workpiece engaging elements adapted to secure a workpiece and said mandrel shaft against relative rotation and axial motion when engaged with a workpiece;

a feed mechanism carried by the mandrel shaft on the rearward side of the cutting head and cooperating with the mandrel shaft and cutting head to advance and retract the cutting head in axially forward and rearward directions along the mandrel shaft when actuated;

a rotary drive coupling carried by the cutting head on its rearward side, said drive coupling drivingly connected to the cutting head for transmitting rotary motion to the cutting head;

a drive motor unit including a housing and an annular drive head connected to the housing;

said drive head including a rotary drive pawl within its annulus connected in driving relationship with said drive coupling, said drive coupling disposed at least in part within said annulus;

said housing extending transversely of the mandrel shaft when the drive head is coupled to the rotary drive coupling;

a drive torque reaction bar secured to the mandrel shaft rearwardly of the rotary drive coupling, the reaction bar non-rotatably coupled to the mandrel shaft and including a transversely extending first leg and at least one axially extending second leg, said axially extending second leg carried by said first leg and extending generally adjacent said mandrel shaft up to a position overlying and adjacent one side of the transversely extending drive motor unit housing, so that substantial relative rotation of the motor housing relative to the mandrel shaft is prevented by said first and second legs of said reaction bar.

20. The portable machine tool as claimed in claim 19, wherein the torque reaction bar is removably secured to the mandrel shaft.

21. The portable machine tool as claimed in claim 20, wherein the torque reaction bar is adjustably mounted on the mandrel shaft by a connector that is arranged to non-rotatably couple the torque reaction bar to the mandrel shaft at various circumferential positions on the mandrel shaft.

22. The portable machine tool as claimed in claim 21, wherein the connector comprises a quick disconnect connector.

23. The portable machine tool as claimed in claim 19, wherein the feed mechanism is located between the cutting head and the drive torque reaction bar.

24. The portable machine tool as claimed in claim 19, wherein the feed mechanism comprises an internally threaded annular feed member concentrically mounted on the mandrel shaft; said mandrel shaft includes external threads coupled to internal threads of said annular feed member; and said annular feed member is arranged to be manually manipulable and rotatable by a hand of a tool operator during operation of the cutting tool to thereby move said cutting head axially along said mandrel shaft.

25. The portable machine tool as claimed in claim 19, wherein the annular feed member is connected by a rotary coupling to the rearward side of the cutting head, said rotary coupling arranged so as to enable relative rotation to the cutting head and the feed mechanism while securing the cutting head and feed mechanism together for simultaneous axial movement along the mandrel shaft.

26. The portable machine tool as claimed in claim 19, wherein said feed mechanism comprises an internally threaded annular feed member concentrically mounted on the mandrel shaft; said mandrel shaft includes external threads coupled to internal threads of said annular feed member; and a feed mechanism actuator carried by the drive torque reaction bar and connected in rotary driving relationship with the feed mechanism, said actuator including a handle for facilitating rotary manipulation of the feed mechanism actuator by a tool operator.

27. The portable machine tool as claimed in claim 26, wherein said drive torque reaction bar is connected to the mandrel shaft by an axially separable connection and said actuator is connected to the annular feed member by a telescopic sliding connection arranged to enable axial sliding separation of the actuator from the feed mechanism.

28. The portable machine tool as claimed in claim 19, wherein said drive coupling includes an annular drive member, and said annular drive head of said drive motor concentrically surrounds said annular drive member.

29. The portable machine tool as claimed in claim 28, wherein the annulus of said annular drive head has a minimum inner diameter and wherein the rotary drive coupling, feed mechanism and all other elements of the tool located rearwardly of the annulus except said torque reaction bar are sized to fit within said annulus.

30. A portable machine tool for preparing annular workpiece ends for welding, comprising:
 a rotary cutting head having a first outer diameter and axially forward and rearward sides, and including at least one cutter seat on the forward side thereof;
 said rearward side including a rearwardly axially projecting hub having a second outer diameter that is smaller than said first outer diameter;
 a mandrel shaft extending axially through the cutting head; said cutting head supported on the mandrel shaft for relative rotation on and axial movement along the mandrel shaft;
 a feed mechanism carried by the cutting head on the rearward side thereof and including internal threads; said mandrel shaft including external threads; said internal threads of said feed mechanism and said external threads of said mandrel shaft connected together so that rotation of the feed mechanism drives the cutting head axially along the mandrel shaft;
 an annular rotary drive coupling carried by the hub, said drive coupling drivingly connected to the hub and configured to receive an annular driving head of a rotary drive motor unit.

31. A portable machine tool as claimed in claim 30, including a torque reaction bar secured to the mandrel shaft rearwardly of the cutting head, the reaction bar non-rotatably and removably secured to the mandrel shaft and including a first radially extending leg and a second axially extending leg carried by the radially extending leg, said second leg extending towards said cutting head.

32. A portable machine tool as claimed in claim 31, wherein said second axially extending leg extends in close proximity to said annular rotary drive coupling.

33. A portable machine tool as claimed in claim 32, including a third axially extending leg carried by said first radially extending leg, said third leg extending generally adjacent said second leg towards said cutting head.

34. A portable machine tool as claimed in claim 31, wherein said torque reaction bar is secured to the mandrel shaft by a quick disconnect connector.

35. A portable machine tool as claimed in claim 30, wherein said feed mechanism is rotatably coupled to a rearward side of the hub and constrained against relative axial movement relative to the cutting head.

36. A portable machine tool as claimed in claim 30, wherein said annular rotary drive coupling comprises an annular drive member connected to the cutting head by means of a torque limiting connection.

37. A portable machine tool as claimed in claim 31, wherein said feed mechanism is annular and includes internal threads; said mandrel includes external threads coupled to said internal threads; a feed mechanism actuator carried by said torque reaction bar and including an annular portion telescopically coupled to said feed mechanism; said feed mechanism actuator rotatably connected to and carried by said torque reaction bar.

38. A portable machine tool as claimed in claim 37, including at least one radially extending handle element connected to said feed mechanism actuator.

* * * * *